(12) United States Patent
Uchiyama et al.

(10) Patent No.: US 10,051,004 B2
(45) Date of Patent: Aug. 14, 2018

(54) EVALUATION SYSTEM

(71) Applicant: Hitachi, Ltd., Tokyo (JP)

(72) Inventors: Hiroki Uchiyama, Tokyo (JP); Yusuke Fujihara, Tokyo (JP); Toru Owada, Tokyo (JP); Makoto Kayashima, Tokyo (JP); Satoshi Ohkubo, Tokyo (JP); Jun Hamanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 216 days.

(21) Appl. No.: 15/067,484

(22) Filed: Mar. 11, 2016

(65) Prior Publication Data
US 2016/0366182 A1 Dec. 15, 2016

(30) Foreign Application Priority Data

Jun. 10, 2015 (JP) ................. 2015-117065

(51) Int. Cl.
*H04L 29/06* (2006.01)
*H04L 29/08* (2006.01)

(52) U.S. Cl.
CPC .......... *H04L 63/20* (2013.01); *H04L 63/0227* (2013.01); *H04L 63/101* (2013.01); *H04L 67/125* (2013.01)

(58) Field of Classification Search
None
See application file for complete search history.

(56) References Cited

U.S. PATENT DOCUMENTS

| 7,100,201 | B2 * | 8/2006 | Izatt | H04L 63/0227 709/224 |
| 7,644,436 | B2 * | 1/2010 | Izatt | H04L 63/02 709/224 |
| 9,699,051 | B2 * | 7/2017 | Rată | H04L 43/0858 |
| 2003/0191963 | A1 * | 10/2003 | Balissat | H04L 63/0209 726/12 |
| 2005/0050316 | A1 * | 3/2005 | Peles | H04L 63/0428 713/151 |
| 2005/0125697 | A1 | 6/2005 | Tahara | |
| 2008/0031141 | A1 * | 2/2008 | Lean | H04L 43/026 370/241 |
| 2009/0174551 | A1 * | 7/2009 | Quinn | G06F 21/552 340/540 |
| 2013/0219483 | A1 * | 8/2013 | Cho | G06F 21/56 726/13 |

FOREIGN PATENT DOCUMENTS

WO 2004/062216 A1 7/2004

* cited by examiner

*Primary Examiner* — Christopher Revak
(74) *Attorney, Agent, or Firm* — Mattingly & Malur, PC

(57) ABSTRACT

An evaluation system includes a network device, a gateway device, a policy evaluation device, and first and second control devices. The network device copies a packet received from the first control device and transmits to the gateway device and the policy evaluation device. The gateway device receives the copied packet, performs a first filtering based on the policy stored in a first policy storage unit, transmits the packet to the second control device while storing the result of the first filtering, and transmits the result of the stored first filtering to the policy evaluation device. The policy evaluation device receives the copied packet, performs a second filtering based on the policy stored in a second policy storage unit, stores the result of the second filtering, and evaluates the policy stored in the second policy storage unit based on the results of the two filterings.

13 Claims, 12 Drawing Sheets

EVALUATION SYSTEM

CLAIM OF PRIORITY

The present application claims priority from Japanese application JP 2015-117065 filed on Jun. 10, 2015, the content of which is hereby incorporated by reference into this application.

BACKGROUND OF THE INVENTION

Field of the Invention

The present invention relates to an evaluation system.

Description of the Related Art

Control systems used for social infrastructure such as electricity, railways, water, and gas, as well as for automobiles are required to operate equipment, such as valves and actuators, based on information from sensors and maintain the pressure and temperature set in advance. In order to achieve this operation, it is necessary to periodically obtain information from sensors, check the state, and control actuators as needed.

For this reason, control systems usually perform processing at regular intervals, so that each process performed by each device within a system is required to be completed in one cycle. When a new process and equipment is added or a setting change is made to the current control system configured as described above, the processing time should be completed within one cycle without affecting the normal operation of the control system.

Meanwhile, the existing control system uses a dedicated operating system (OS) and a dedicated protocol and is placed in an area isolated from access from the external network such as the Internet. For this reason, the control system has been considered to be nothing to do with cyber attacks such as so called malware and Denial of Service (DoS) attacks.

However, along with an increase in the use of general-purpose OS and general-purpose protocol for a reduction in costs, the connection to information systems has been accelerated for an increase in efficiency. At the same time, malware that target control systems have been detected in recent years. Thus, it is necessary to develop a technology to prevent threats such as a malware infection and unauthorized access from outside, also in the control system as in the information system.

In addition, such attacks are evolving each day and it is necessary to periodically update the filtering policy of communication packets used in the firewall or other filtering device in order to prevent and detect new attacks.

To address the requirements described above, Patent Document 1 (WO 2004/062216) discloses a technique for evaluating the validity of a filtering policy by creating a simulation environment in which the target system is simulated in advance, and by transmitting and receiving communication packets between the simulation environment and a filtering device.

The use of the technique disclosed in Patent Document 1 enables evaluation of the validity of a filtering policy in an environment available to a simulation. However, there are various configurations for the control system according to the application and environment to be used. Also, the customer may change the operation environment and configuration after the delivery of the system by the system vendor. Thus, it is difficult to rebuild the local environment by the use of the simulation environment.

Further, if the actual environment is used as it is, the usual operation of the control system may be affected, making it difficult to complete the evaluation before the filtering policy is applied to the real environment.

The present invention has been made in view of the above circumstances, and it is an object of the present invention to provide a system that evaluates the validity of a new filtering policy in such a way that the real environment of the new system can be used without affecting the usual operation.

SUMMARY OF THE INVENTION

A typical evaluation system according to the present invention is an evaluation system including a network device, a gateway device, a policy evaluation device, a first control device, and a second control device. The network device copies a packet received from the first control device, and transmits to the gateway device and the policy evaluation device. The gateway device receives the copied packet, performing a first filtering process based on the policy stored in a first policy storage unit, transmitting the packet that has passed through the first filtering process to the second control device while storing the result of the first filtering process, and transmitting the result of the stored first filtering process to the policy evaluation device. The policy evaluation device receives the copied packet, performing a second filtering process based on the policy stored in a second policy storage unit, storing the result of the second filtering process, and evaluating the policy stored in the second policy storage unit based on the result of the transmitted first filtering process and the result of the stored second filtering process.

According to one aspect of the present invention, it is possible to provide a system that evaluates the validity of a new filtering policy in such a way that the real environment of the control system can be used without affecting the usual operation.

DETAILED DESCRIPTION OF THE PREFERRED EMBODIMENTS

Hereinafter, preferred embodiments of the present invention will be described with reference to the accompanying drawings.

First Embodiment

Figure 1:
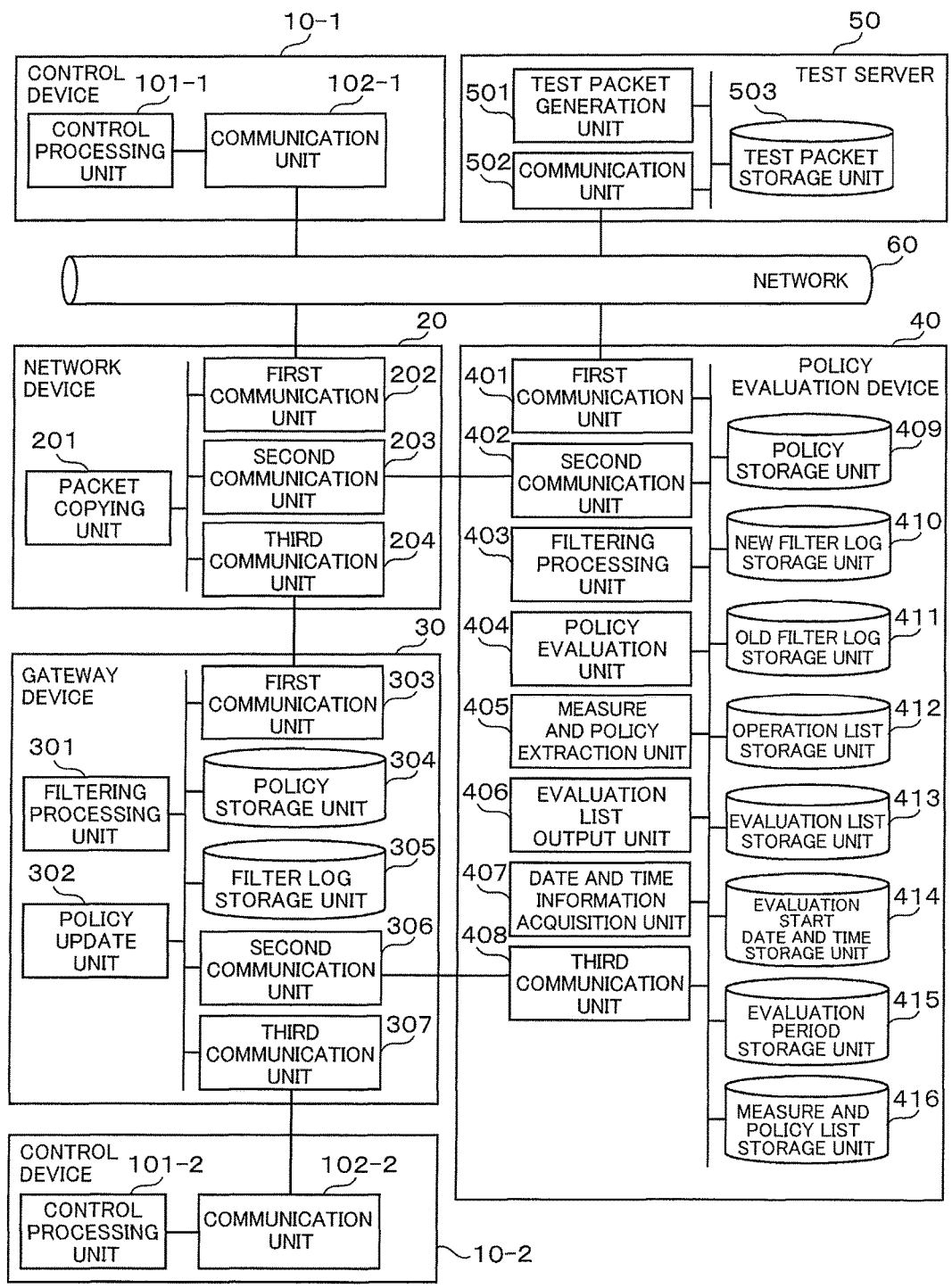
FIG. 1 is a diagram showing an example of the configuration of a filtering policy evaluation system.

FIG. 1 is a diagram showing an example of the configuration of a filtering policy evaluation system. As shown in the example in FIG. 1, the filtering policy evaluation system according to a first embodiment includes a control device 10-1, a control device 10-2, a network device 20, a gateway device 30, a policy evaluation device 40, a test server 50, and a network 60.

Each of the control devices 10-1 and 10-2 is a device that performs a control operation based on a control command transmitted and received by a communication packet through the network 60. The example shown in FIG. 1 is a configuration in which the control device 10-1 generates a control command and transmits the generated control command to the control device 10-2 and in which the control device 10-2 performs the control operation upon receiving the control command. The configuration of the control device in the system is not limited to this example. It may also be possible that a plurality of control devices are connected to the network 60 and a plurality of control devices are connected to the gateway device 30.

The control device 10-1 and the control device 10-2 include a control processing unit 101-1 and a control processing unit 101-2 to perform the control process, respectively, and a communication unit 102-1 and a communication unit 102-2 to communicate with the network 60, the gateway device 30, and the like, respectively. Each unit can be configured in hardware. Further, it may also be possible to connect an upper (host) server (not shown) to the control device 10-1 and generate a control command by controlling the control device 10-1 from the upper server. Note that in the following description, the control device 10-1 and the control device 10-2 are referred to as control device 10 in the description common to both of them.

The network device 20 is a device for relaying the communication packet. The network device 20 is provided with a packet copying unit 201 for copying the communication packet input from the network 60 to the network device 20, a first communication unit 202 for performing communication with the network 60, a second communication unit 203 for performing communication with the policy evaluation device 40, and a third communication unit 204 for performing communication with the gateway device 30.

The gateway device 30 is a device for filtering the communication packet. The gateway device 30 is provided with a filtering processing unit 301 for performing a filtering process on the communication packet input to the gateway device 30, a policy update unit for updating the filtering policy stored in the gateway device 30, and a first communication unit 303 for performing communication with the network device 20.

Further, the gateway device 30 is provided with a policy storage unit 304 for storing the filtering policy used in the filtering processing unit 301, a filter log storage unit 305 for storing the filter log generated as a result of performing the filtering process by the filtering processing unit 301, a second communication unit 306 for performing communication with the policy evaluation device 40, and a third communication unit 307 for performing communication with the control device 10-2. Each unit can be configured in hardware.

The policy evaluation device 40 is a device for evaluating the filtering policy to be newly updated. The policy evaluation device 40 is provided with a first communication unit 401 for performing communication with the network 60, a second communication unit 402 for performing communication with the network device 20, a filtering processing unit 403 for performing a filtering process on the communication packet input to the policy evaluation device 40, and a policy evaluation unit 404 for evaluating the validity of the update filtering policy set in the policy evaluation device 40.

Further, the policy evaluation device 40 is provided with a measure and policy extraction unit 405 for extracting a proposed measure when it is determined that a problem exists as a result of the evaluation of the filtering policy, an evaluation list output unit 406 for outputting the evaluation list in which the evaluation result as well as the measure and policy are described for each operation, a date and time information acquisition unit 407 for obtaining the date and time information synchronized with the time of a predetermined standard time, a third communication unit 408 for performing communication with the gateway device 30, and a policy storage unit 409 for storing the filtering policy used in the filtering processing unit 403.

Further, the policy evaluation device 40 is provided with a new filtering log storage unit 410 for storing the filtering log generated as a result of performing the filtering process by the filtering processing unit 403, an old filter log storage unit 411 for storing the filter log received from the gateway device 30, an operation list storage unit 412 for storing the operation list required to evaluate the influence associated with the policy change, and an evaluation list storage unit 413 for storing the evaluation list in which the evaluation result as well as the measure and policy are described for each operation.

Further, the policy evaluation device 40 is provided with an evaluation start date and time storage unit 414 for storing the date and time when the evaluation of the filtering policy was started, an evaluation period storage unit 415 for storing the evaluation period indicating the period in which the evaluation is performed using the actual operation data, and a measure and policy list storage unit 416 for storing the measure and policy list when the evaluation result of the filtering policy is beyond the design tolerance range. Note that each unit can be configured in hardware.

An operation is identified by an operation ID set in advance. For example, one upper server may be connected to the control device 10-1 to handle one operation, and one control device 10-2 may be configured to be used for a plurality of operations. Thus, a combination of the control devices 10-1 and 10-2 can be identified according to the operation. Further, the pattern and the like, including the source and destination of the communication packet can be set in advance according to the operation.

The test server 50 is provided with a test packet generation unit 501 for generating a test packet to be transmitted to the policy evaluation device 40, a communication unit 502 for performing communication with the network 60, and a test packet storage unit 503 for storing the test packet generated in advance by the test packet generation unit 501. Note that each unit can be configured in hardware.

Figure 2:
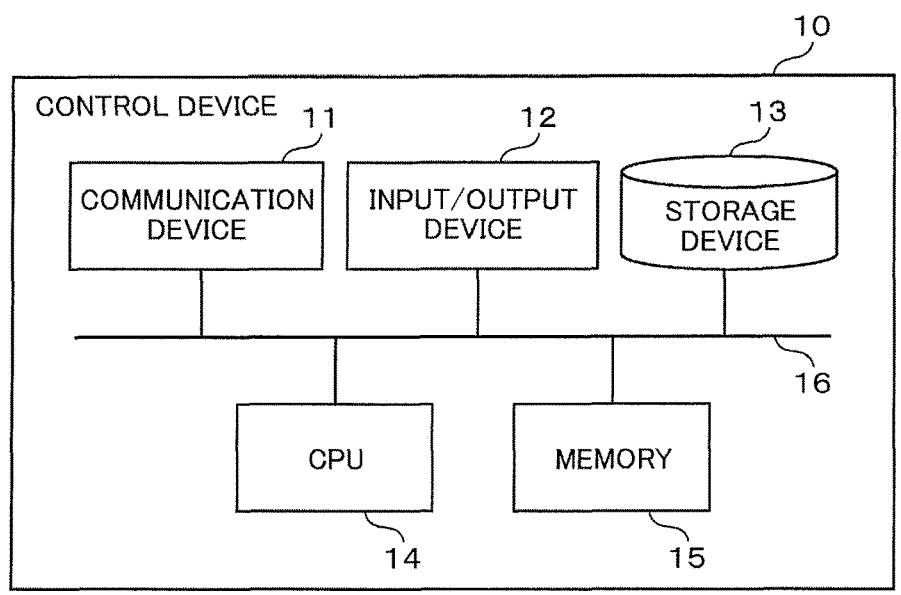
FIG. 2 is a diagram showing an example of the hardware configuration of a control device.

FIG. 2 is a diagram showing an example of the hardware configuration of the control device 10. The control device 10 may have a configuration shown in FIG. 2, or for example, a configuration of a general computer, in addition to the configuration provided with the control processing units 101-1, 101-2 and the communication units 102-1, 102-2 as described with reference to FIG. 1.

The control device 10 shown in FIG. 2 includes: a communication device 11 connected to the network 60 or to the third communication unit 307 of the gateway device 30; an input/output device 12 connected to a keyboard and display or the like (not shown), or connected to these devices; a storage device 13 such as a hard disk device or a flash memory; a central processing unit (CPU) 14; a memory 15; and an internal communication line 16 such as a bus connecting these components.

Further, the control device 10-2 may also include dedicated hardware for performing the control process. The CPU 14 can achieve the process equivalent to the control processing units 101-1 and 101-2 by executing a program stored in the memory 15 or the storage device 13. The communication device 11 can be the device corresponding to the communication units 102-1, 102-2.

Figure 3:
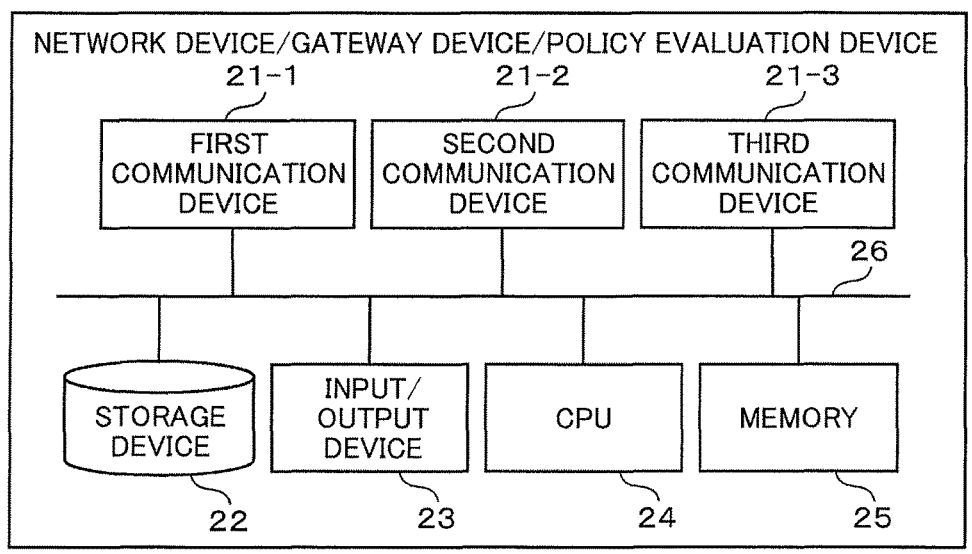
FIG. 3 is a diagram showing an example of the hardware configuration of a network device, a gateway device, and a policy evaluation device.

FIG. 3 is a diagram showing an example of the hardware configuration of the network device 20, the gateway device 30, and the policy evaluation device 40. The network device 20, the gateway device 30, and the policy evaluation device 40 may have a configuration shown in FIG. 3, or for example, a configuration of a general computer, in addition to the configuration described with reference to FIG. 1. In the configuration shown in FIG. 3, the network device 20, the gateway device 30, and the policy evaluation device 40 can have the same configuration.

The network device 20, the gateway device 30, and the policy evaluation device 40 include a first communication device 21-1, a second communication device 21-2, a third communication device 21-3, a storage device 22, an input/output device 23, a CPU 24, a memory 25, and an internal communication line 26 such as a bus connecting these components.

Here, the first communication device 21-1 can be a device corresponding to the first communication unit 202, the first communication unit 303, and the first communication unit 401. The second communication device 21-2 can be a device corresponding to the second communication unit 203, the second communication unit 306, and the second communication unit 402. The third communication device 21-3 can be a device corresponding to the third communication unit 204, the third communication unit 307, and the third communication unit 408.

Excluding these units, the process equivalent to each of the units of the network device 20, the gateway device 30, and the policy evaluation device 40, which are described with reference to FIG. 1, may be achieved by the CPU 24 by executing a program stored in the memory 25 or the storage device 22.

Figure 4:
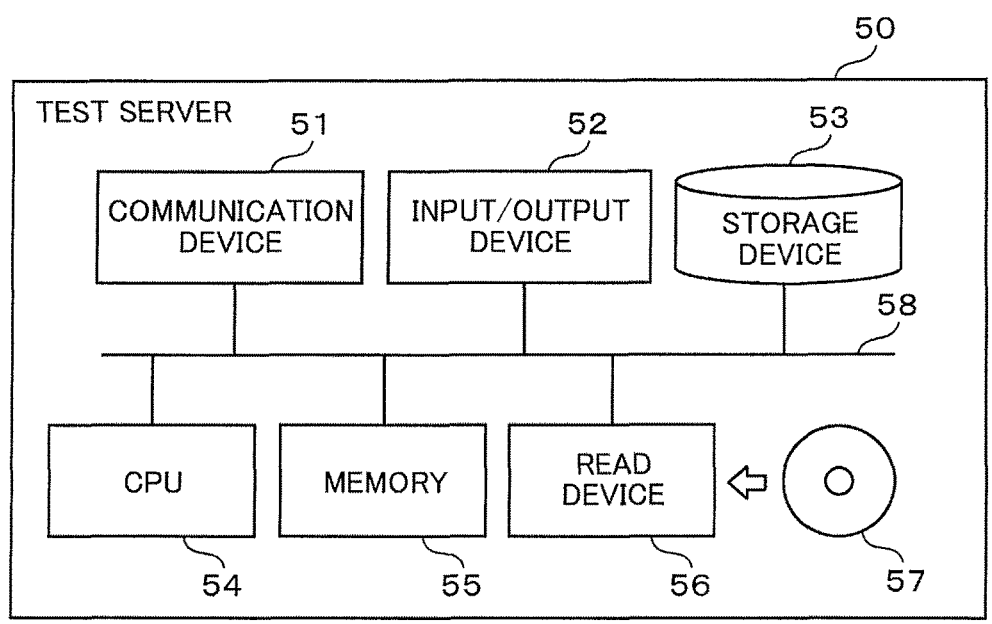
FIG. 4 is a diagram showing an example of the hardware configuration of a test server.

FIG. 4 is a diagram showing an example of the hardware configuration of the test server 50. The test server 50 may have a configuration shown in FIG. 4, or for example, a configuration of a general computer, in addition to the configuration provided with the test packet generation unit 501, the communication unit 502, and the test packet storage unit 503 as described with reference to FIG. 1.

The test server 50 includes a communication device 51 connected to the network 60, an input/output device 52, a storage device 53, a CPU 54, a memory 55, a read device 56 for reading a storage medium 57, and an internal communication line 58 such as a bus connecting these components. The storage medium is, for example, a removable and portable storage medium, and may be a removable flash memory or an optical disk. The information stored in the storage medium 57 can be read by the read device 56 and stored in the storage device 53.

Further, the CPU 54 may achieve the process equivalent to the test packet generation unit 501 and the test packet storage unit 503 by executing a program stored in the memory 55 or the storage device 53. The communication device 51 can be a device corresponding to the communication unit 502.

Hereinafter, the process flow in the filtering policy evaluation system will be described. The process flow described below is executed by each of the processing units realized on the device configuring the filtering policy evaluation system in such a way that a program that is stored in each of the storage devices 13, 22, and 53 of the control device 10, the network device 20, the gateway device 30, the policy evaluation device 40, and the test server 50 is loaded in each of the memories 15, 25, and 55, and then is executed by each of the CPUs 14, 24, and 54.

Here, the respective programs may be stored in advance in the storage devices 13, 22, and 53, or may be installed through another storage medium or communication medium (a network or a carrier propagating through the network).

Figure 5:
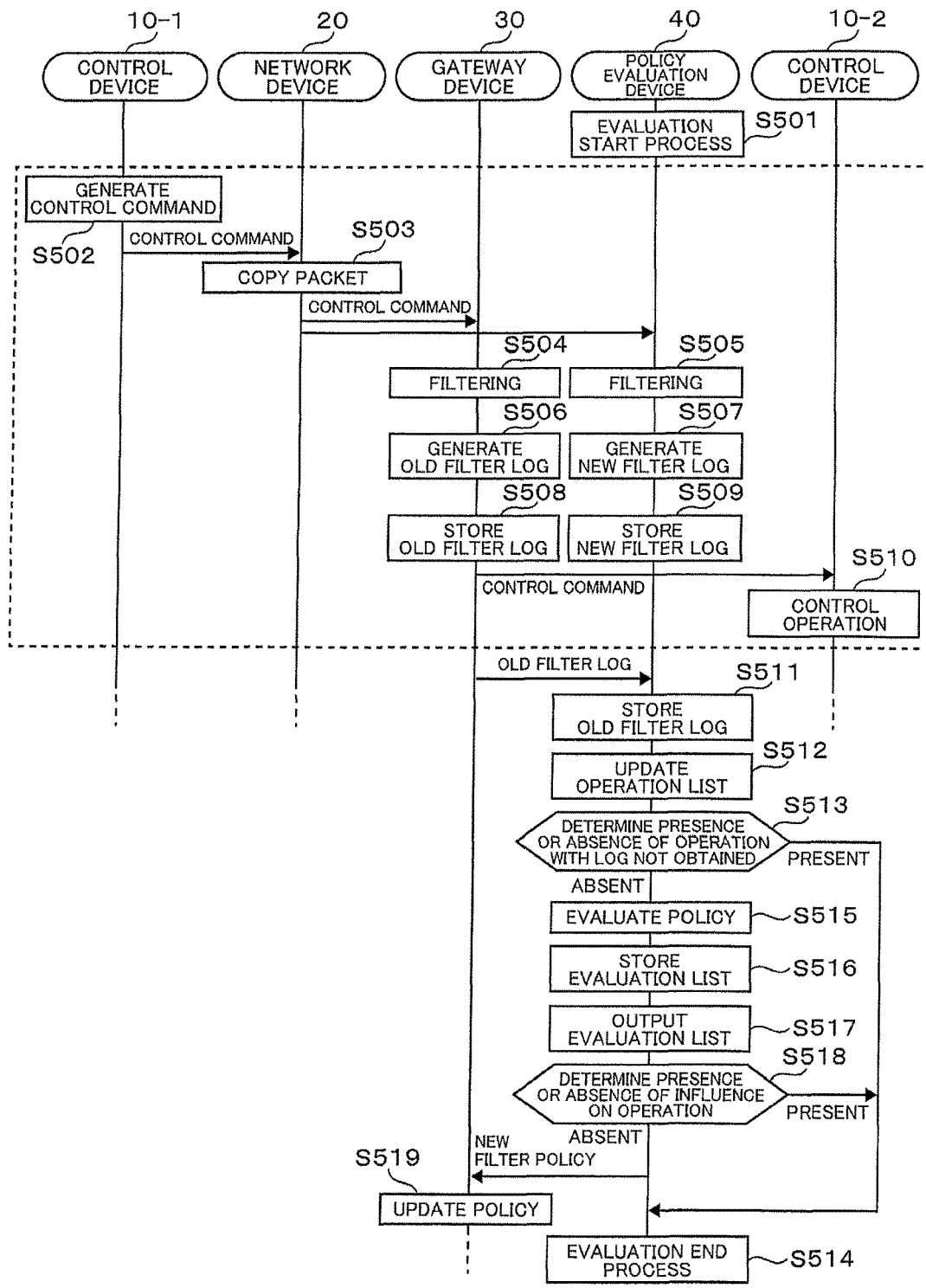
FIG. 5 is a diagram showing an example of the process flow for evaluating the filtering policy by the policy evaluation device by means of actual communication.

FIG. 5 is a diagram showing an example of the process flow in the filtering policy evaluation system in which the policy evaluation device 40 evaluates the filtering policy by means of actual communication between the control devices 10. Here, it is shown an example of the process of transmitting a control command from the control device 10-1 to the control device 10-2 to evaluate the policy stored in the policy storage unit 409 of the policy evaluation device 40.

The policy stored in the policy storage unit 409 is designed to newly update the policy stored in the policy storage unit 304 of the gateway device 30, and is evaluated before it is actually used in the gateway device 30.

The policy evaluation device 40 performs an evaluation start process (S501). Here, the evaluation start process includes: a process in which the date and time information acquisition unit 407 obtains the current date and time and stores in the evaluation start date and time storage unit 414; a process of setting the log acquisition state, which is stored in the operation list storage unit 412, to be not obtained; and a process of clearing the actual processing time, the evaluation result, and the measure and policy in the evaluation list stored in the evaluation list storage unit 413. Note that this process may simply be referred to as S501 and the same expression may be used in the following description.

Regardless of S501, the control device 10-1 transmits a plurality of control commands to the control device 10-2. In these transmissions, the control device 10-1 generates a control command also after S501 (S502). Then, the control device 10-1 transmits the generated control command to the control device 10-2.

More specifically, the destination of the control command is set to the address of the control device 10-2 and transmitted to the network 60. Here, it may be possible that the final destination is set to the address of the control device 10-2 and the first arrival destination is set to the network device 20. Note that S502 may be performed in such a way that the policy evaluation device 40 informs the control device 10-1 about the destination address in S501.

The network device 20 receives the control command from the control device 10-1 through the network 60. Then, the network device 20 copies the control command received from the control device 10-1 (S503), and transmits the copied control command to the gateway device 30 and the policy evaluation device 40.

The gateway device 30 performs a filtering process on the control command received from the network device 20 by the use of the filtering policy stored in the policy storage unit 304 (S504). An example of the filtering policy will be described below with reference to FIG. 8. Then, the gateway device 30 generates an old filter log showing the result of the filtering process (S506). An example of the old filter log will be described below with reference to FIG. 9.

The gateway device 30 stores the generated old filter log in the filter log storage unit 305 (S508). Then, the gateway device 30 transmits the control command executed in the filtering process to the control device 10-2. In this example, it is assumed that the control command is a regular communication transmitted from the control device 10-1 and passes through the filtering process based on the filtering policy stored in the policy storage unit 304.

The control device 10-2 performs a control operation based on the received control command (S510). The content itself of the control operation has no connection with the filtering process and the description thereof will be omitted.

Meanwhile, the policy evaluation device 40 performs the filtering process on the control command received from the network device 20 by the use of the filtering policy stored in the policy storage unit 409 (S505). Then, the policy evaluation device 40 generates a new filter log showing the result of the filtering process (S507), and stores the generated new filter log in the new filter log storage unit 410 (S509).

The operation from S502 to S510 surrounded by dashed lines may be performed once or repeated several times to store one or a plurality of old filter logs and new filter logs with respect to one or a plurality of control commands. The gateway device 30 stores a predetermined number of old filter logs. Then, the gateway device 30 transmits the old filter logs to the policy evaluation device 40.

Note that, in FIG. 5, the transmission of old filter log is shown outside the dashed lines. However, this operation may be included in the dashed lines, transmitting the old filter log to the policy evaluation device 40 for each command, instead of transmitting a predetermined number of old filter logs. Further, the old filter log may be transmitted to the policy evaluation device 40 at a predetermined time interval starting with a predetermined condition or at a predetermined time. Further, the transmission of control command may be continued after the old filter log is transmitted.

When the old filter log is transmitted, the policy evaluation device 40 stores the old filter log received from the gateway device 30 into the old filter log storage unit 411 (S511). Next, the policy evaluation device 40 extracts the control command included in the received old filter log by the use of the packet pattern of the operation list stored in the operation list storage unit 412. Then, the policy evaluation device 40 updates the log acquisition state of the operation list (S512). An example of the operation list will be described below with reference to FIG. 10.

The policy evaluation device 40 determines the presence or absence of the operation in which the old filter log has not been obtained in the updated operation list (S513). As a result of this determination, when it is determined that there is an operation in which the old filter log has not been obtained, the policy evaluation device 40 ends the process (S514). On the other hand, when it is determined that the old filter log has been obtained in all the operations, the policy evaluation device 40 performs evaluation of the filtering policy (S515). The detailed procedure of the evaluation of the filtering policy will be described below with reference to FIG. 7.

The policy evaluation device 40 stores the evaluation list generated in S515 into the evaluation list storage unit 413 (S516). Then, the policy evaluation device 40 outputs the stored evaluation list to the input/output device 23 of the policy evaluation device 40 and to the external device, not shown, or other device (S517). Here, the process can be ended.

The policy evaluation device 40 determines the presence or absence of an influence on the operation based on the evaluation list (S518). As a result of this determination, when it is determined that there is an influence on the operation, the policy evaluation device 40 ends the process (S514). On the other hand, when it is determined that there is no influence on the operation, the policy evaluation device 40 transmits the new filtering policy stored in the policy storage unit 409 of the policy evaluation device 40 to the gateway device 30. The gateway device 30 stores the received new filtering policy in the policy storage unit 304 and updates the policy (S519).

Figure 6:
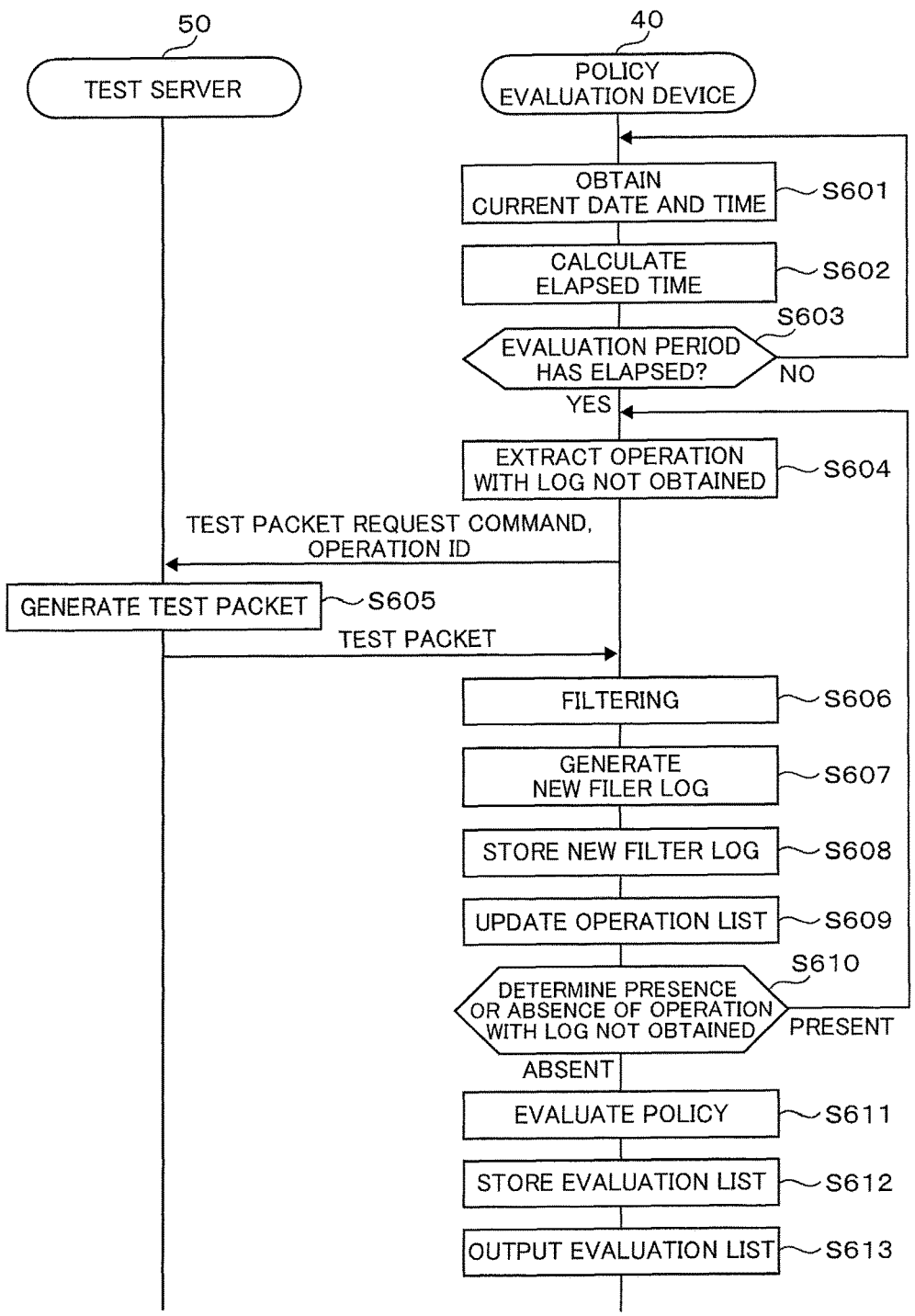
FIG. 6 is a diagram showing an example of the process flow for evaluating the filtering policy by the policy evaluation device using the test server.

FIG. 6 is a diagram showing an example of the process flow in the filtering policy evaluation system in which the policy evaluation device 40 evaluates the filtering policy by the use of the test server 50. This process is performed parallel to the process flow described with reference to FIG. 5 in order to prevent the state in which the filtering policy is not evaluated remains because it is determined that there is an operation in which the old filter log has not been obtained in S513 and S515 is not performed. Thus, when a predetermined time has elapsed, the policy evaluation device 40 evaluates the filtering policy by the use of the test packet of the test server 50.

The policy evaluation device 40 obtains the current date and time (S601). Next, the policy evaluation device 40 obtains the evaluation start date and time from the evaluation start date and time storage unit 414, and calculates the elapsed time from the evaluation start date and time (S602). Then, the policy evaluation device 40 obtains the evaluation period set in advance from the evaluation period storage unit 415 to determine if the elapsed time calculated in S602 is beyond the evaluation period (S603).

As a result of this determination, when it is determined that the elapsed time is not beyond the evaluation period, the policy evaluation device 40 returns to S601 and obtains the current date and time. On the other hand, when it is determined that the elapsed time is beyond the evaluation period, the policy evaluation device 40 obtains the operation list stored in the operation list storage unit 412, and extracts the operation in which the filter log has not been obtained (S604). The policy evaluation device 40 transmits the ID of the extracted operation as well as a command to request a test packet for the extracted operation, to the test server 50.

In response to this, based on the received test packet request command and the operation ID, the test server 50 generates a test packet by generating a test packet by the test packet generation unit 501 or by extracting the test packet stored in the test packet storage unit 503 (S605). Here, the test packet may be generated by collecting all the control commands at the timing of a test run, or the like, such as when the system is built. It may also be possible that the test packet is manually generated and set in advance for the test server 50.

The test server 50 transmits the generated test packet to the policy evaluation device 40. At this time, the test server 50 transmits the test packet to the first communication unit 401 of the policy evaluation device 40, without through the network device 20. This is to prevent that the test packet is transmitted to the control device 10-2 in which the packet does not normally flow and affects the operation.

The policy evaluation device 40 performs the filtering process on the received test packet by the use of the filtering policy stored in the policy storage unit 409 (S606). Then, the policy evaluation device 40 generates a new filter log showing the result of the filtering process (S607). Next, the policy evaluation device 40 stores the generated new filter log in the new filter log storage unit 410 (S608).

The policy evaluation device 40 extracts the control command included in the generated new filter log by the use of the packet pattern of the operation list stored in the operation list storage unit 412. Then, the policy evaluation device 40 updates the log acquisition state of the operation list (S609). Then, the policy evaluation device 40 determines the presence or absence of the operation in which the filter log has not been obtained in the updated operation list (S610). As a result of this determination, when it is determined that there is an operation in which the filter log has not been obtained, the policy evaluation device 40 returns to S604 to perform the test packet request and filtering process again.

On the other hand, when it is determined that the filter log has been obtained in all the operations, the policy evaluation device evaluates the filter policy (S611). The detailed procedure of the evaluation of the filtering policy will be described below with reference to FIG. 7. The policy evaluation device 40 stores the evaluation list generated in S611 into the evaluation list storage unit 413 (S612). Then, the policy evaluation device 40 outputs the stored evaluation list to the input/output device 23 of the policy evaluation device 40 and to the external device, not shown, or other device (S613).

The process can be ended here. Further, as described with reference to S518 and S519 in FIG. 5, the new filtering policy can be stored in the policy storage unit 304 of the gateway device 30 to update the policy.

Note that it may also be possible to store the old filter log, which is the result of performing the filtering process on the test packet by the filtering policy stored in the policy storage unit 304, into the old filter log storage unit 411 in advance, without actually processing it by the filtering processing unit 301. In this case, the old log may be stored in advance in the old filter log storage unit 411 at the time of test run. Or, when the content of the test packet is determined, the old filter log generated for the particular test packet may be stored in the old filter log storage unit 411 in advance.

Figure 7:
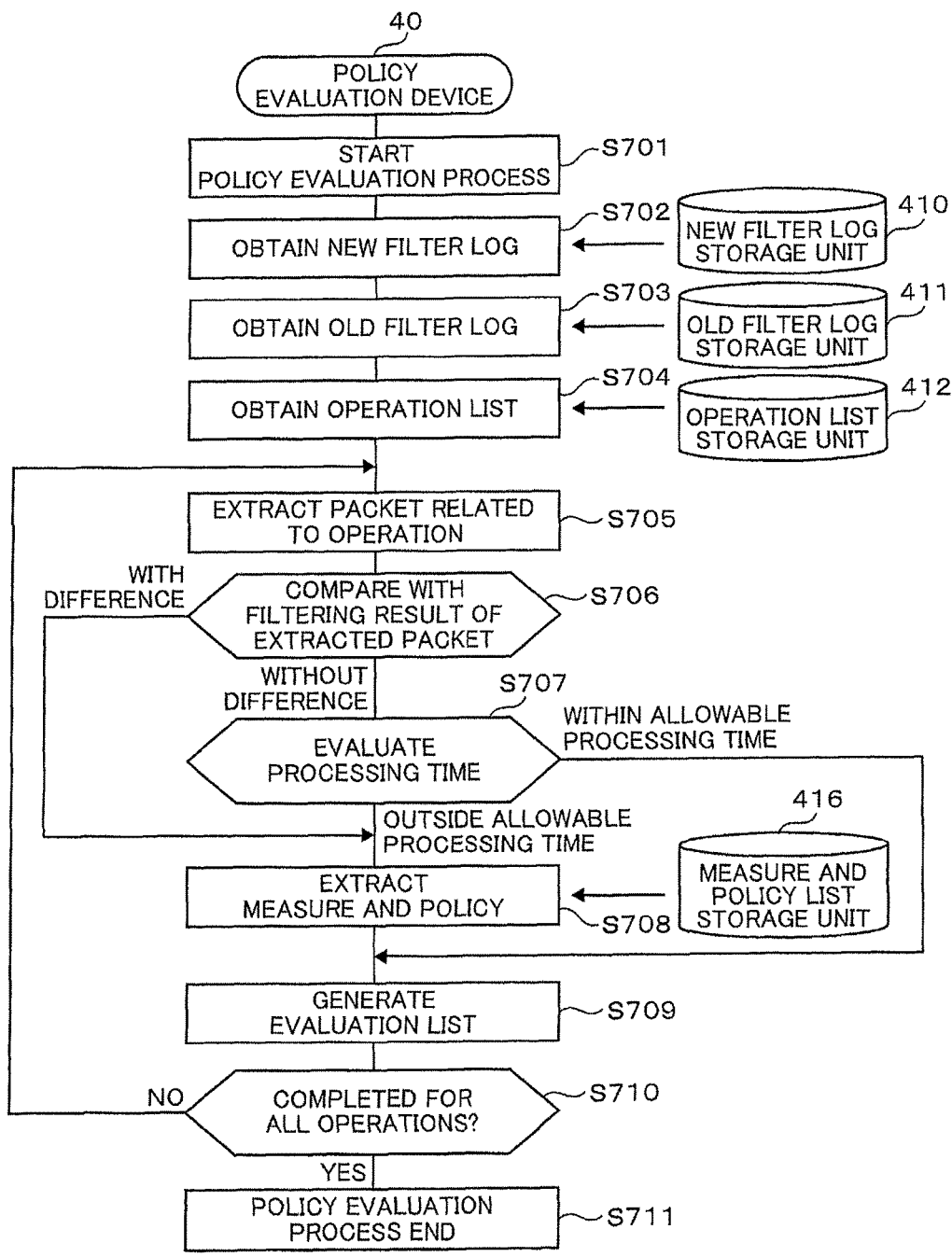
FIG. 7 is a diagram showing an example of the process flow of the policy evaluation.

FIG. 7 is a diagram showing an example of the process flow in the filtering policy evaluation system in which the policy evaluation (S515, S611) is performed within the policy evaluation device 40. As has been described, the regular communication transmitted from the control device 10-1 passes through the filtering process based on the filtering policy stored in the policy storage unit 304 of the gateway device 30.

However, if the regular communication transmitted from the control device 10-1 does not pass through the filtering process based on the filtering policy stored in the policy storage unit 409 of the policy evaluation device 40, the new filtering policy stored in the policy storage unit 409 may inhibit the normal operation of the system.

For this reason, the new filtering policy is evaluated by comparing the old filter log and the new filter log. At the same time, the filtering policy that causes the time of the filtering process to increase is evaluated as inhibition of the normal operation of the system.

First, the policy evaluation device 40 starts the policy evaluation process (S701), and obtains the new filter log stored in the new filter log storage unit 410 (S702). Next, the policy evaluation device 40 obtains the old filter log stored in the old filter log storage unit 411 (S703). Then, the policy evaluation device 40 obtains the operation list stored in the operation list storage unit 412 (S704).

The policy evaluation device 40 extracts operation related packets included in the new filter log and the old filter log based on the packet pattern of one operation included in the operation list obtained in S704 (S705). Next, the policy evaluation device 40 compares the extracted operation related packet included in the new filter log with the extracted operation related packet included in the old filter log (S706)

As a result of this comparison, when it is determined that there is a difference in the filtering results, the policy evaluation device 40 performs a measure and policy extraction (S708). The process content of the measure and policy extraction will be described below. On the other hand, when it is determined that there is no difference in the filtering results, the policy evaluation device 40 evaluates the processing time of the operation related packet included in the new filter log (S707).

In the processing time evaluation, the maximum allowable processing time is set in advance for each operation, which is the time required to fulfill the filtering process. The processing time evaluation compares the maximum allowable processing time for each operation included in the operation list stored in the operation list storage unit 412, with the packet filtering processing time that is calculated from the log of the extracted operation related packet, to determine whether the calculated packet filtering processing time exceeds the maximum allowable processing time.

As a result of this determination, when it is determined that the packet filtering processing time is within the maximum allowable processing time, the policy evaluation device 40 performs an evaluation list generation process (S709). The content of the process of the evaluation list generation will be described below. On the other hand, when it is determined that the packet filtering processing time exceeds the maximum allowable processing time, the policy evaluation device 40 extracts a proposed measure based on the difference pattern of the measure and policy list stored in the measure and policy list storage unit 416 (S708). The structure of the measure and policy list, the difference pattern, and the proposed measure will be described below with reference to FIG. 12.

The policy evaluation device 40 generates an evaluation list based on the result from S706 to S708 (S709). The structure of the evaluation list will be described below with reference to FIG. 11. The policy evaluation device 40 determines whether the evaluation of all the operations included in the operation list obtained in S704 has been completed, in other words, it determines whether the packet patterns of all the operations have been processed (S710).

As a result of this determination, when it is determined that the evaluation of all the operations has not been completed, the policy evaluation device 40 returns to S705 and extracts the operation related packets included in the new filter log and the old filter log based on another operation packet pattern included in the operation list obtained in S704. When it is determined that the evaluation of all the operations has been completed, the policy evaluation device 40 ends the policy evaluation process and returns to the process before performing the policy evaluation process (S711).

Figure 8:
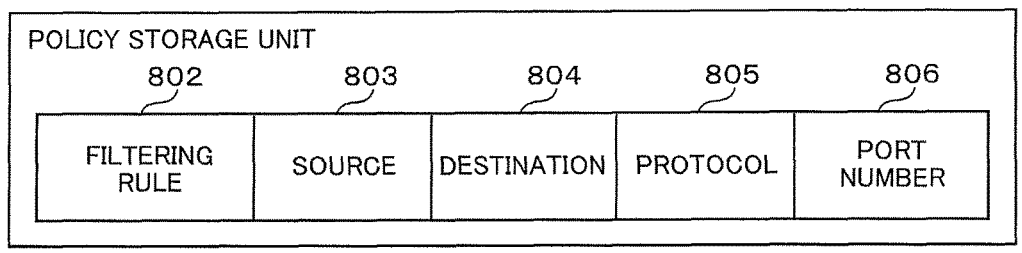
FIG. 8 is a diagram showing an example of the filtering policy.

FIG. 8 is a diagram showing an example of the filtering policy stored in the policy storage unit in the filtering policy evaluation system. Here, the policy storage unit is the policy storage unit 304 of the gate way device 30 and the policy storage unit 409 of the policy evaluation device 40. The structure of the information to be stored is common to both of the policy storage units.

One filtering policy includes the following elements including: a filtering rule 802 that shows the filtering setting information such as accepting or blocking of the passage of the received packet; a packet source 803; a packet destination 804; a used protocol 805; and a port number 806. The filtering rule 802 may be applied when all the values of the packet source 803, packet destination 804, used protocol 805, and port number 806 of the filtering policy match the respective values of the received packet.

It is also possible that, in addition to the case in which all of the values match, the filtering rule 802 is applied to the case in which some of the values of the respective elements match. Values of elements to be used for the match determination can be set in advance. Each of the values of the elements of the filtering policy can be set in advance by using the input/output device 23, or through the network not shown, or other method.

Note that the elements of the filtering policy are not limited to the elements described above, but should include at least these elements. Further, the order of the elements of one filtering policy is not limited to the order shown in FIG. 8. In addition, although one filtering policy is shown in the example of FIG. 8, a plurality of filtering policies may be stored in the policy storage unit and performed in the order in which they are stored.

Figure 9:
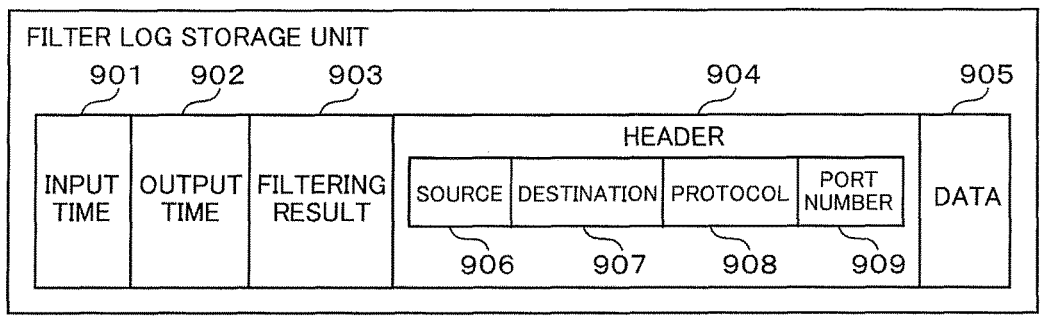
FIG. 9 is a diagram showing an example of the filter log.

FIG. 9 is a diagram showing an example of the filtering log stored in the filtering log storage unit. Here, the filtering log storage unit is the filtering log storage unit 305 of the gateway device 30, and the new filtering log storage unit 410 and the old filtering log storage unit 411 in the policy evaluation device 40. The structure of the information to be stored is common to both of the filtering log storage units.

One filtering log includes the following elements including: an input time 901, an output time 902, a filtering result 903, a header 904, and a data 905. The input time 901 is the time at which the filtering process is started, and the output time 902 is the time at which the filtering process is completed. The time for the filtering process can be calculated by calculating the difference between the value of the input time 901 and the value of the output time 902.

Thus, for example, the gateway device 30 may store the time at which the first communication unit 303 received the packet into the input time 901. Further, the gateway device 30 may store the time of transmitting the packet from the third communication unit 307 or the time of determining the blocking of the packet into the output time 902. The policy evaluation device 40 may store the time at which the second communication unit 402 received the packet into the input time 901, and may store the time of determining that the packet is permitted or blocked into the output time 902.

The filtering result 903 stores the result of the execution of the filtering process based on the filtering policy described with reference to FIG. 8. The value of the filtering result 903 may be accepting or blocking. The header 904 is the header of the received packet, including a packet source 906, a packet destination 907, a used protocol 908, and a port number 909.

The data 905 is the data of the received packet. The data 905 may be the packet data itself or may be the value obtained by converting such data. Incidentally, the data 905 may not be necessary. When the packet is received, the header of the received packet and the data are copied to the header 904 and to the data 905. Then, the value is stored in the input time 901. When the filtering process is completed, the values are stored in the filtering result 903 and the output time 902.

Note that the elements of the filtering log are not limited to the elements described above, but at least include the following three elements, including the information from which the filtering processing time can be obtained, the filtering result 903, and the header 904. Further, the order of the elements of the filtering log is not limited to the order shown in FIG. 9. In addition, although one filtering log is shown in the example of FIG. 9, a plurality of filtering logs can be stored in the filtering log storage unit.

Figure 10:
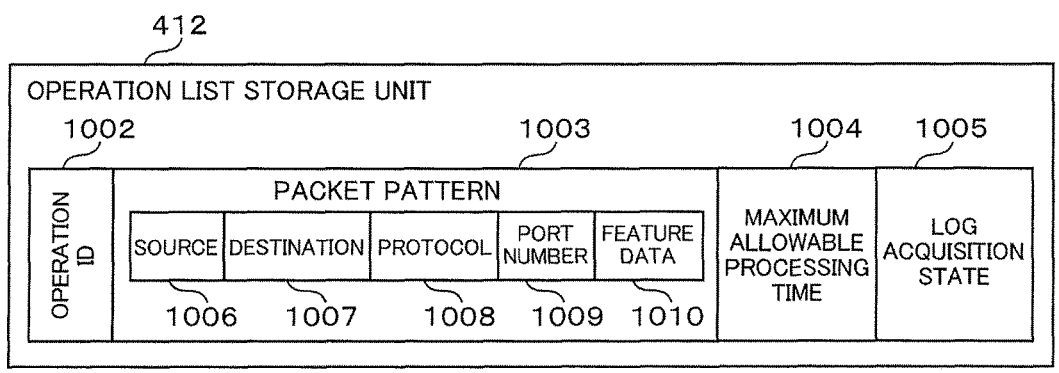
FIG. 10 is a diagram showing an example of the operation list.

FIG. 10 is a diagram showing an example of the operation list stored in the operation list storage unit 412 of the policy evaluation device 40 in the filtering policy evaluation system. One operation list includes the following elements including: an operation ID 1002 that indicates the information for identifying the operation; a packet pattern 1003 showing the structure of the communication packet for each operation; a maximum allowable processing time 1004 that indicates the maximum value of the packet processing time allowed to each operation; and a log acquisition state 1005 that indicates whether or not the filter log associated with each operation has been obtained.

The packet pattern 1003 includes a packet source 1006, a packet destination 1007, a used protocol 1008, a port number 1009, and feature data 1010. The feature data 1010 may be the data itself to be actually transmitted and received, or part of data of such data at a predetermined position, or a value obtained by converting such data. Incidentally, the feature data 1010 may not be necessary if the data is not included in the filter log.

The respective values of the operation ID 1002, the packet pattern 1003, and the maximum allowable processing time 1004 may be set in advance by using the input/output device 23, or through the network not shown, or other method according to each operation. The initial value of the log acquisition state 1005 can be set to not obtained.

The value of the header 904 of the filter log and the value of the data 905 are compared with the packet pattern 1003 of the operation list. If the comparison results match, the operation of the particular filter log may be identified as the operation of the operation ID 1002. In this case, the value of the log acquisition state 1005 corresponding to the matching packet pattern 1003 may be determined to be obtained.

Note that the elements of the operation list are not limited to the elements described above, but should include at least these elements. Further, the order of the elements of the operation list is not limited to the order shown in FIG. 10. In addition, although one operation list is shown in the example of FIG. 10, a plurality of operation lists may be stored in the operation list storage unit 412.

Figure 11:
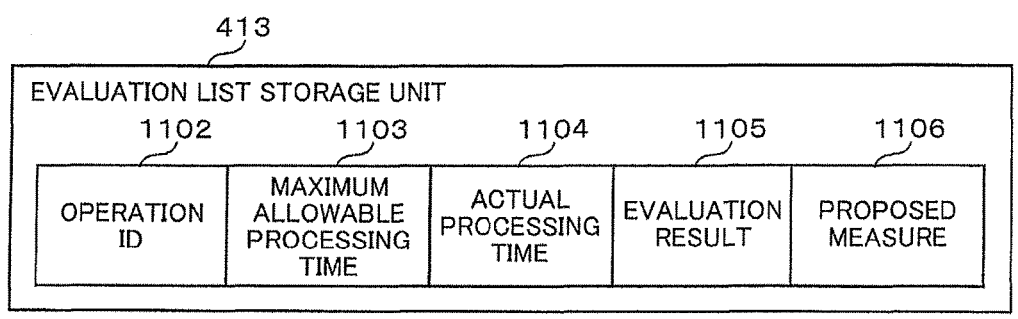
FIG. 11 is a diagram showing an example of the evaluation list.

FIG. 11 is a diagram showing an example of the evaluation list stored in the evaluation list storage unit 413 of the policy evaluation device 40 in the filtering policy evaluation system. One evaluation list includes the following elements including: an operation ID 1102 that indicates the information for identifying the operation; a maximum allowable processing time 1103 that indicates the maximum value of the packet processing time allowed to each operation; an actual processing time 1104 that indicates the actual packet processing time calculated from the obtained log; an evaluation result 1105 that indicates the presence or absence of an influence on each operation; and a proposed measure 1106 that is output when there is an influence as a result of the evaluation.

The operation ID 1102 corresponds to the operation ID 1002 of the operation list. The maximum allowable processing time 1103 stores the value of the maximum allowable processing time 1004 of the operation list. Then, the actual processing time 1104 stores the value of the header 904 that matches the pattern of the packet pattern 1003 corresponding to the operation ID 1002, as well as the difference between the input time 901 and the output time 902, which are the values of the data 905.

The evaluation result 1105 is the information showing the presence of an influence on the operation when the measure and policy extraction is performed in S708 as described with reference to FIG. 7. Otherwise, the evaluation result 1105 is the information showing the absence of an influence on the operation. Further, the proposed measure 1106 stores the measure of the proposed measure 1203 extracted in S708.

Note that the elements of the evaluation list are not limited to the elements described above, but should include at least these elements. Further, the order of the elements of the evaluation list is not limited to the order shown in FIG. 11. In addition, although one evaluation list is shown in the example of FIG. 11, a plurality of evaluation lists may be stored in the evaluation list storage unit 413.

Figure 12:
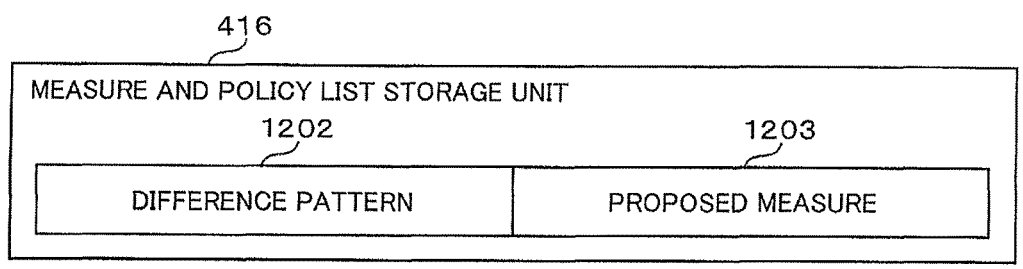
FIG. 12 is a diagram showing an example of the measure and policy list.

FIG. 12 is a diagram showing an example of the measure and policy list stored in the measure and policy list storage unit 416 of the policy evaluation device 40 in the filtering policy evaluation system. One measure and policy list includes: a difference pattern 1202 that groups the differences between two logs of the log output when the pre-update policy (old policy) is applied, and the log output when the update policy (new policy) is applied; and a proposed measure 1203 which is the measure content when a difference pattern occurs.

Here, the pre-update policy may be the policy stored in the policy storage unit 304 of the gateway device 30, and the update policy may be the policy stored in the policy storage unit 409 of the policy evaluation device 40.

Further, for example, the difference pattern 1202 may be the difference between the filtering results (accepting, blocking) included in two logs, or may be the difference between the processing times. When there is a difference in the filtering result, the packet that should normally be permitted is blocked and obviously results in an influence on the operation, so that the measure content may require a measure other than filtering.

On the other hand, when there is a difference in the processing time, it may be possible to generate another difference pattern, including the point of whether or not the difference between the time of the filtering process based on the update policy and the maximum allowable processing time 1004 is less than a predetermined value.

If the result is less than the predetermined value, the measure content may require a review of the execution order of the update policy stored in the policy storage unit 409, as well as a review of the content of the policy. If the result exceeds the predetermined value, the measure content may require a measure other than filtering, as in the case in which there is a difference in the filtering result.

The content of the difference pattern 1202 and the proposed measure 1203 may be set in advance by using the input/output device 23, or through the network not shown, or other method.

Note that the elements of the measure and policy list are not limited to the elements described above, but should include at least these elements. Further, the order of the elements of the measure and policy list is not limited to the order shown in FIG. 12. In addition, although one measure and policy list is shown in the example of FIG. 11, a plurality of evaluation lists may be stored in the measure and policy list storage unit 416.

As described above, by using the control device 10, the gateway device 30, and the network 60 that are actually used, it is possible to evaluate the filtering policy in the real environment. Further, by copying the packet in the network device 20 and by evaluating the copied packet in the policy evaluation device 40, it is possible to perform the evaluation without affecting the normal operation of the real environment.

Also with respect to a packet that is rarely generated in the real environment, it is possible to evaluate the packet, when it is not generated for a predetermined period of time, in such a way that the test server generates a test packet. Further, it is also possible to evaluate the filtering processing time that is important for the control system.

Second Embodiment

The filtering policy evaluation system of the first embodiment includes the network device 20, the gateway device 30, and the policy evaluation device 40. However, in a filtering policy evaluation system according to a second embodiment, these three devices are integrated into one gateway device 30-1. In this way, it is also possible to build a filtering policy evaluation system with less hardware resources.

Figure 13:
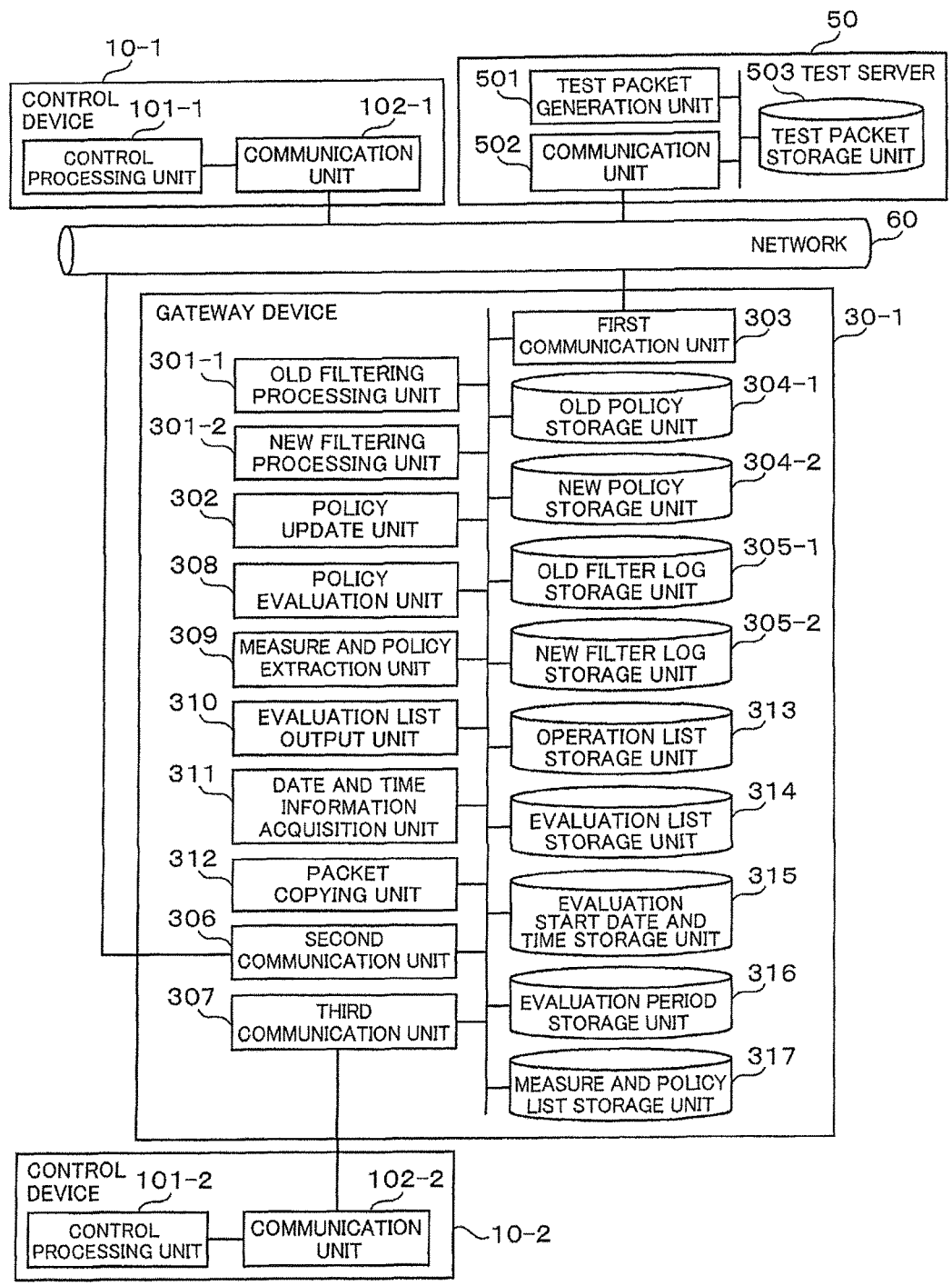
FIG. 13 is a diagram showing an example of the configuration of the filtering policy evaluation system configured with the gateway device.

FIG. 13 is a diagram showing an example of the configuration of the filtering policy evaluation system. As shown in an example in FIG. 13, the filtering policy evaluation system of the second embodiment includes control devices 10-1 and 10-2, a gateway device 30-1, a test server 50, and a network 60. The control devices 10-1 and 10-2, the test server 50, and the network 60 have the same configuration that has been described with the same reference numerals, so that the description thereof is omitted.

The gateway device 30-1 is provided with an old filtering processing unit 301-1 for performing a filtering process on the communication packet that is input to the gateway device 30-1, based on the filtering policy stored in an old policy storage unit 304-1, a new filtering processing unit 301-2 for performing a filtering process based on the filtering policy stored in a new policy storage unit 304-2, and a policy update unit 302 for updating the filtering policy stored in the old policy storage unit 304-1.

Further, the gateway device 30-1 is provided with a first communication unit 303 for performing communication with the network 60, the old policy storage unit 304-1 for storing the filtering policy used in the old filtering processing unit 301-1, the new policy storage unit 304-2 for storing the filtering policy used in the new filtering processing unit 301-2, an old filter log storage unit 305-1 for storing the filter log that is generated as a result of performing the filtering process in the old filtering processing unit 301-1, and a new filter log storage unit 305-2 for storing the filter log that is generated as a result of performing the filtering process in the new filtering processing unit 301-2.

Further, the gateway device 30-1 is provided with a second communication unit 306 for performing communication with the test server 50 through the network 60, a third communication unit 307 for performing communication with the control device 10-2, a policy evaluation unit 308 for evaluating the validity of the update filtering policy stored in the new policy storage unit 304-2, and a measure and policy extraction unit 309 for extracting a measure when it is determined that a problem exists.

Further, the gateway device 30-1 is provided with an evaluation list output unit 310 for outputting the evaluation list in which the evaluation result as well as the measure and policy are described for each operation, a date and time information acquisition unit 311 for obtaining the date and time information synchronized with the time of a predetermined standard time, a packet copying unit 312 for copying the communication packet input to the gateway device 30-1, and an operation list storage unit 313 for storing the operation list required to evaluate the influence associated with the policy change.

Further, the gateway device 30-1 is provided with an evaluation list storage unit 314 for storing the evaluation list in which the evaluation result as well as the measure and policy are described for each operation, an evaluation start date and time storage unit 315 for storing the date and time at which the evaluation of the update filtering policy was started, an evaluation period storage unit 316 for storing the evaluation period that indicates the period of time for performing the evaluation using the actual operation data, and a measure and policy list storage unit 317 for storing the measure and policy list when the evaluation result of the update filtering policy exceeds the design tolerance range.

Figure 14:
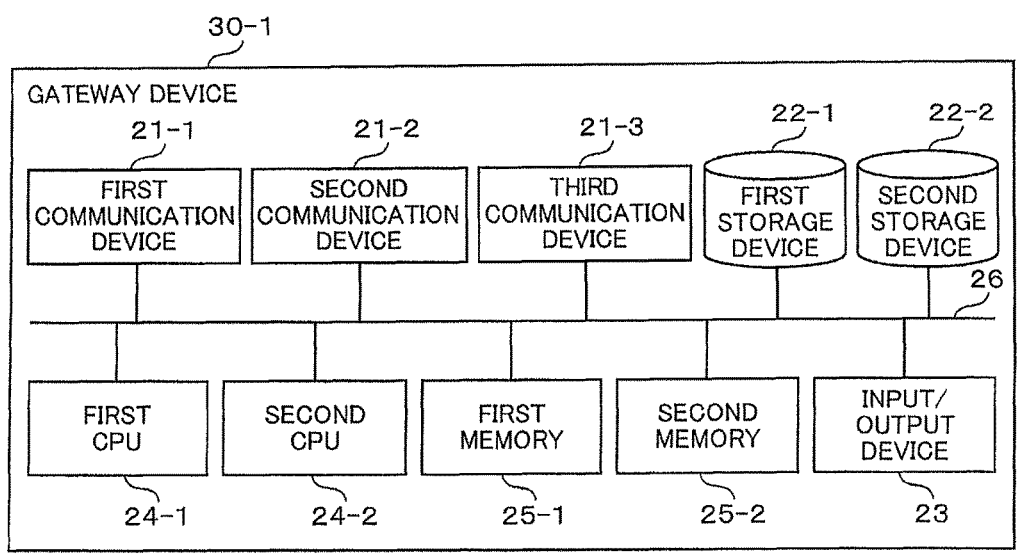
FIG. 14 is a diagram showing an example of the hardware configuration of the gateway device.

FIG. 14 is a diagram showing an example of the hardware configuration of the gateway device 30-1. The gateway device 30-1 may have a configuration shown in FIG. 14, or for example, a configuration of a general computer, in addition to the configuration described with reference to FIG. 13.

The gateway device 30-1 includes a first communication device 21-1, a second communication device 21-2, a third communication device 21-3, a first storage device 22-1, a second storage device 22-2, an input/output device 23, a first CPU 24-1, a second CPU 24-2, a first memory 25-1, a second memory 25-2, and an internal communication line 26 such as a bus connecting such components.

Here, of the processing units shown in FIG. 13, for example, the operation contents of the old filtering processing unit 301-1, the old policy storage unit 304-1, and the old filter log storage unit 305-1 may correspond to the operation contents of the first storage device 22-1, the first CPU 24-1, and the first memory 25-1. The operation contents of the other processing units and the storage units may correspond to the operation contents of the second storage device 22-2, the second CPU 24-2, and the second memory 25-2.

With the operation contents determined as described above, it is possible to perform the actual operation related process (old filtering processing) and the policy evaluation related process (new filtering processing) in another real environment. As a result, the influence on the operation can be minimized.

Note that the operation content of the packet copying unit 312 may correspond to the operation content of the second CPU 24-2. Further, when the processing capability of the CPU is sufficiently high, it can be configured as a single CPU instead of being divided the first CPU 24-1 and the second CPU 24-2, or each of the first CPU 24-1 and the second CPU 24-2 can be the core of the CPU and not the CPU. However, the execution environment of the operation related to the actual operation and the execution environment of the process related to the policy evaluation have a high degree of independence. Thus, it is desirable that the environments have the same level of processing capability.

The process flow in the filtering policy evaluation system according to the second embodiment will be described. The process flow described below is executed by the individual processing units realized on the device configuring the filtering policy evaluation system in such a way that each program stored in each of the storage devices 13, 22-1, 22-2, and 53 of the control devices 10-1 and 10-2, the gateway device 30-1, and the test server 50 is loaded in each of the memories 15, 24-1, 24-2 and 55, and is executed by each of the CPUs 14, 24-1, 24-2, and 54.

Further, the respective programs may be stored in advance in the storage devices 13, 22-1, 22-2, and 53, or may be installed when it is needed through another storage medium or communication medium (a network or a carrier propagating through the network).

Figure 15:
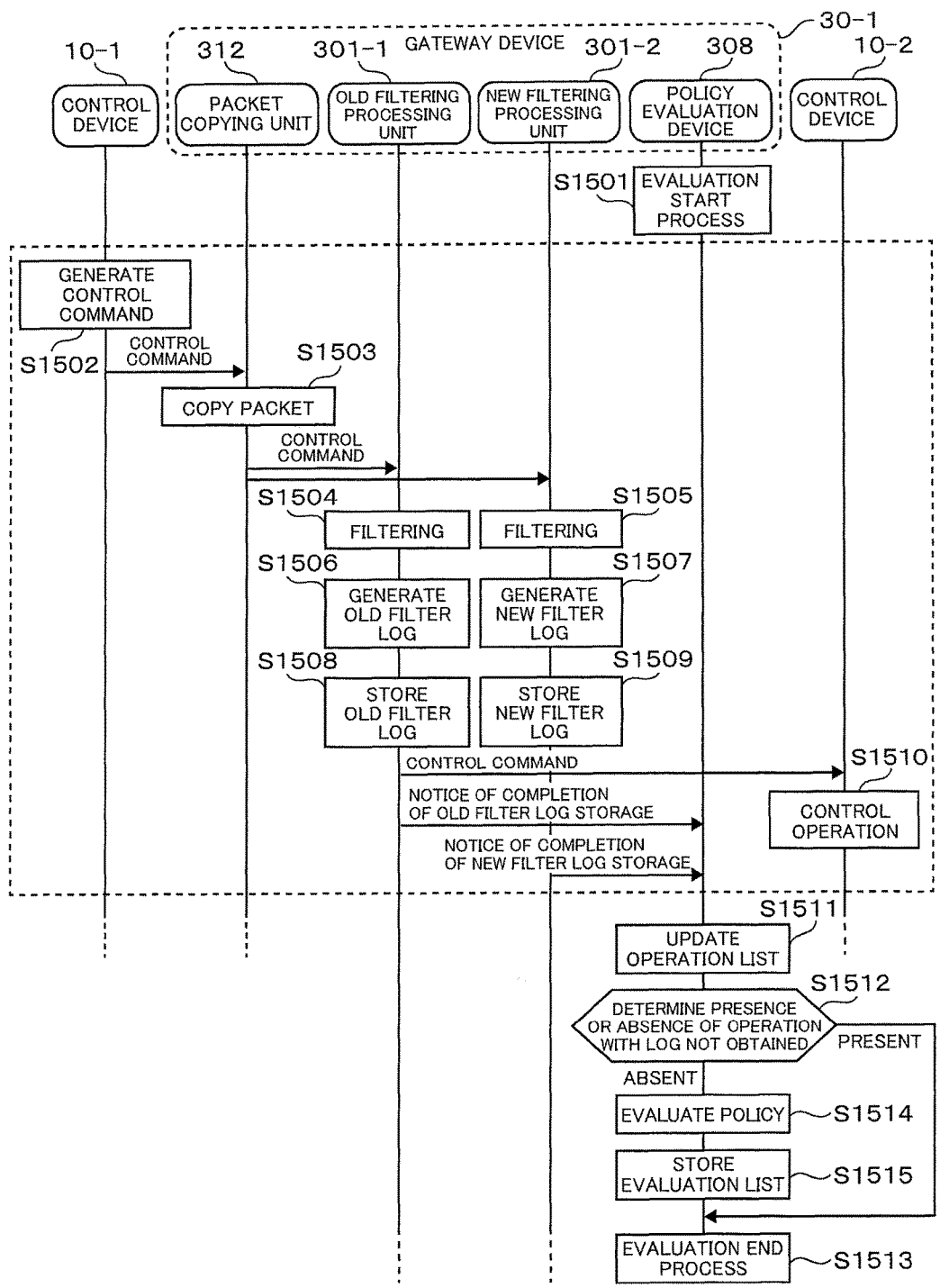
FIG. 15 is a diagram showing an example of the process flow for evaluating the filtering policy by the gateway device by means of actual communication.

FIG. 15 is a diagram showing an example of the process flow in the filtering policy evaluation system in which the gateway device 30-1 evaluates the filtering policy by means of actual communication between the control devices 10-1 and 10-2. Here, it is shown an example of the process of transmitting a control command from the control device 10-1 to the control device 10-2 to evaluate the policy stored in the new policy storage unit 304-2 of the gateway device 30-1.

The policy evaluation unit 308 of the gateway device 30-1 performs an evaluation start process (S1501). Here, the evaluation start process includes: a process of obtaining the current date and time and storing in the evaluation start date and time storage unit 315; a process of setting the log acquisition state of the operation list stored in the operation list storage unit 313 to not obtained; and a process of clearing the actual processing time, the evaluation result, and the measure and policy in the evaluation list stored in the evaluation list storage unit 314.

Regardless of S1501, the control device 10-1 transmits a plurality of control commands to the control device 10-2. In these transmissions, the control device 10-1 generates a control command also after S1501 (S1502), and transmits the generated control command to the control device 10-2.

The packet copying unit 312 of the gateway device 30-1 copies the control command received from the control device 10-1 (S1503). Then, the packet copying unit 312 transmits the copied control command to the old filtering processing unit 301-1 and the new filtering processing unit 301-2.

The old filtering processing unit 301-1 of the gateway device 30-1 performs a filtering process on the packet received from the packet copying unit 312 by the use of the filtering policy stored in the old policy storage unit 304-1 (S1504). Next, the old filtering processing unit 301 generates an old filter log that indicates the result of the filtering process (S1506), and stores the generated old filtering log in the old filter log storage unit 305-1 (S1508). Then, the old filtering processing unit 301-1 transmits the control command that performed the filtering process to the control device 10-2. Then, the old filtering processing unit 301-1 transmits a notice of the completion of the old filter log storage to the policy evaluation unit 308 of the gateway device 30-1.

The control device 10-2 performs a control operation based on the received control command (S1510).

Meanwhile, the new filtering processing unit 301-2 of the gateway device 30-1 performs a filtering process on the packet received from the packet copying unit 312 by the use of the filtering policy stored in the new policy storage unit 304-2 (S1505). Then, the new filtering processing unit 301-2 generates a new filter log that indicates the result of the filtering process (S1507), and stores the generated new filter log in the new filter log storage unit 305-2 (S1509). Then, the new filtering processing unit 301-2 transmits a notice of the completion of the new filter log storage to the policy evaluation unit 308 of the gateway device 30-1.

The operation from S1502 to S1510 surrounded by dashed lines may be performed once or repeated several times to store one or a plurality of old filter logs and new filter logs with respect to one or a plurality of control commands. It may also be possible to continue transmission of control command after the operation surrounded by the dashed lines.

Next, the policy evaluation unit 308 of the gateway device 30-1 extracts the operation packet included in the old filter log stored in the old filter log storage unit 305-1 by the use of the packet pattern of the operation list stored in the operation list storage unit 313. Then, the policy evaluation unit 308 updates the log acquisition state of the operation list (S1511).

The policy evaluation unit 308 determines the presence or absence of the operation in which the old filter log has been obtained in the updated operation list (S1512). As a result of this determination, when it is determined that there is an operation in which the old filter log has not been obtained, the policy evaluation unit 308 ends the process (S1513). On the other hand, when it is determined that the old filter log is obtained in all the operations, the policy evaluation unit 308 evaluates the filtering policy (S1514). Here, the detailed procedure of the filtering policy is the same as described with reference to FIG. 7.

Next, the policy evaluation unit 308 stores the evaluation list generated in S1514 into the evaluation list storage unit 314 (S1515). Here, the policy evaluation unit 308 may end the process (S1513), or may determine the presence or absence of an influence on the operation as described above. If it is determined that there is no influence on the operation, the policy evaluation unit 308 may store the filtering policy stored in the new policy storage unit 304-2 into the old policy storage unit 304-1.

Figure 16:
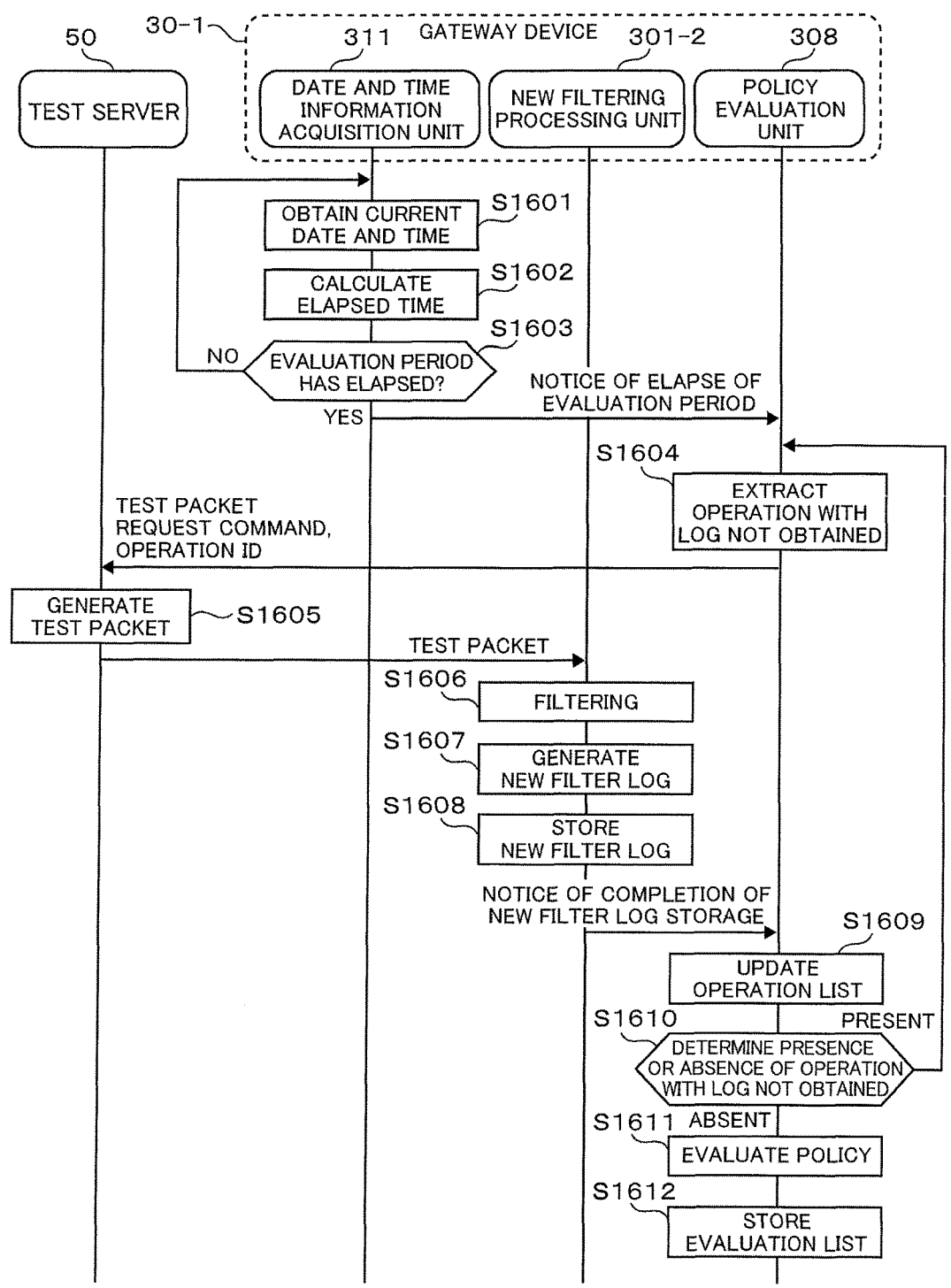
FIG. 16 is a diagram showing an example of the process flow for evaluating the filtering policy by the gateway device using the test server.

FIG. 16 is a diagram showing an example of the process flow in the filtering policy evaluation system in which the policy evaluation device 40 evaluates the filtering policy by the use of the test server 50. This process can also be performed in the evaluation of the filtering policy to be applied by the use of the gateway device 30-1 when the elapsed time from the evaluation start date and time is beyond a predetermined evaluation period.

The date and time information acquisition unit 311 of the gateway device 30-1 obtains the current date and time (S1601). Next, the date and time information acquisition unit 311 obtains the evaluation start date and time from the evaluation start date and time storage unit 315 to calculate the elapsed time from the evaluation start date and time (S1602). Then, the date and time information acquisition unit 311 obtains the evaluation period set in advance from the evaluation period storage unit 316, and determines whether the elapsed time calculated in S1602 exceeds the evaluation period (S1603).

As a result of this determination, when it is determined that the calculated elapsed time is not beyond the evaluation period, the date and time information acquisition unit 311 returns to S1601 to obtain the current date and time. On the other hand, when it is determined that the calculated elapsed time is not beyond the evaluation time, the date and time information acquisition unit 311 transmits a notice of the elapse of the evaluation period, which indicates that the elapsed time is beyond the evaluation period, to the policy evaluation unit 308.

The policy evaluation unit 308 of the gateway device 30-1 obtains the operation list stored in the operation list storage unit 313, and extracts the operation in which the filter log has not been obtained (S1604). The policy evaluation unit 308 transmits the ID of the extracted operation, as well as a test packet request command for the extracted operation to the test server 50.

In response to this, based on the received test packet request command and the operation ID, the test server 50 generates a test packet by generating a test packet in the test packet generation unit 501, or by extracting a test packet stored in the test packet storage unit 503 (S1605). Here, the test packet may be generated by collecting all the control commands at the timing of a test run, or the like, or may be manually generated and set in advance.

The test server 50 transmits the generated test packet to the new filtering processing unit 301-2 of the gateway device 30-1. At this time, the test server 50 transmits the test packet to the second communication unit 306 and not to the first communication unit 303. This is to prevent that the test packet is transmitted to the control device 10-2 in which the packet does not normally flow and affects the operation.

The new filtering processing unit 301-2 of the gateway device 30-1 performs a filtering process on the received test packet by the use of the filtering policy stored in the new policy storage unit 304-2 (S1606). Then, the new filtering processing unit 301-2 generates a new filter log that indicates the result of the filtering process (S1607). Next, the new filtering processing unit 301-2 stores the generated new filter log in the new filter log storage unit 305-2 (S1608). Then, the new filtering processing unit 301-2 transmits a notice of the completion of the new filter log storage to the policy evaluation unit 308 of the gateway device 30-1.

The policy evaluation unit 308 of the gateway device 30-1 updates the log acquisition state of the operation list by extracting the control command included in the generated new filter log by the use of the packet pattern of the operation list stored in the operation list storage unit 313 (S1609). Then, the policy evaluation unit 308 determines the presence or absence of an operation in which the filter log has not been obtained in the updated operation list (S1610). As a result of this determination, when it is determined that there is an operation in which the filter log has not been obtained, the policy evaluation unit 308 returns to S1604 to request again a test packet and perform a filtering process.

On the other hand, when it is determined that the filter log is obtained in all the operations, the policy evaluation unit 308 evaluates the filtering policy (S1611). Here, the detailed procedure of the evaluation of the filtering policy is the same as the procedure which has been described with reference to FIG. 7. The policy evaluation unit 308 stores the evaluation list generated in S1611 into the evaluation list storage unit 314 (S1612).

Note that the old filter log as a result of performing the filtering process on the test packet based on the filtering policy stored in the old policy storage unit 304-1 may be stored in advance in the old filter log storage unit 305-1, without being actually processed in the old filtering processing unit 301-1.

As described above, by using the control device 10, the gateway device 30-1, and the network 60 that are actually used, it is possible to evaluate the filtering policy in the real environment. Further, the packet is copied within the gateway device 30-1 and is evaluated in the process other than filtering process for the normal operation. In this way, it is possible to perform the evaluation without affecting the normal operation of the real environment.

Also with respect to a packet that is rarely generated in the real environment, it is possible to evaluate the packet, when it is not generated for a predetermined period of time, in such a way that the test server generates a test packet. Further, it is also possible to evaluate the filtering processing time that is important for the control system. The evaluation can be performed by a single gateway device 30-1.

Note that the present invention is not limited to the above embodiments and various modifications and alterations can be made within the scope of the present invention. For example, the process of the gateway device may be included in the control device, or the control device and the gateway device may not include the communication units with the network and may communicate with the network through other devices. It is to be noted that in these embodiments, there is no essential difference in the process performed in the whole system.

What is claimed is:

1. An evaluation system comprising a network device, a gateway device, a policy evaluation device, a first control device, and a second control device,
   wherein the network device copies a packet received from the first control device and transmits to the gateway device and the policy evaluation device,
   wherein the gateway device receives the copied packet, performs a first filtering process based on the policy stored in a first policy storage unit, transmits the packet that has passed through the first filtering process to the second control device while storing the result of the first filtering process, and transmits the result of the stored first filtering process to the policy evaluation device,
   wherein the policy evaluation device receives the copied packet, performs a second filtering process based on the policy stored in a second policy storage unit, stores the result of the second filtering process, and evaluates the policy stored in the second policy storage unit based on the result of the transmitted first filtering process and the result of the stored second filtering process,
   wherein the gateway device includes a first processing time of the first filtering process into the result of the first filtering process, and
   wherein the policy evaluation device includes a second processing time of the second filtering process into the result of the second filtering process, determines the difference between the first processing time and the second processing time, compares the second processing time with a predetermined processing time as limitation, and evaluates the policy stored in the second policy storage unit.

2. The evaluation system according to claim 1,
   wherein the gateway device includes a first result, which is the accepting or blocking of the passage of the copied packet, into the result of the first filtering process, and
   wherein the policy evaluation device includes a second result, which is the accepting or blocking of the passage of the copied packet, into the result of the second filtering process, and determines the difference between the first result and the second result to evaluate the policy stored in the second policy storage unit.

3. The evaluation system according to claim 2,
   wherein the policy evaluation device generates an evaluation list by extracting the proposed measure according to the difference between the first result and the second result, or by extracting the proposed measure according to the result of comparing the second processing time with the predetermined processing time as a limitation, and outputs the evaluation list.

4. The evaluation system according to claim 3,
   wherein the policy evaluation device transmits the policy stored in the second policy storage unit to the gateway device based on the result of the evaluation, and
   wherein the gateway device stores the transmitted policy in the first policy storage unit.

5. The evaluation system according to claim 4,
   wherein the policy evaluation device extracts the result associated with the predetermined operation from the result of the transmitted first filtering process, extracts the result associated with the particular predetermined operation from the result of the stored second filtering process, and evaluates the policy stored in the second policy storage unit.

6. The evaluation system according to claim 5,
   wherein the policy evaluation device extracts the result associated with the predetermined operation by comparing the pattern of the packet included in the result of the transmitted first filtering process with the pattern of the packet used for the particular predetermined operation, extracts the result associated with the predetermined operation by comparing the pattern of the packet included in the result of the stored second filtering process with the pattern of the packet used for the particular predetermined operation, and extracts the result associated with the particular predetermined operation.

7. The evaluation system according to claim 6,
   wherein when it is determined that the result of the transmitted first filtering process includes the result associated with all the predetermined operations, the policy evaluation device evaluates the policy stored in the second policy storage unit.

8. The evaluation system according to claim 7,
   wherein the evaluation system further comprises a test server,
   wherein the test server transmits a test packet to the policy evaluation device in response to a request of the policy evaluation device,
   wherein the policy evaluation device comprises a first communication unit for performing communication with the network device and a second communication unit for performing communication with the test server, receives the test packet through the second communication unit, performs the second filtering process based on the policy stored in the second policy storage unit, and stores the result of the second filtering process.

9. The evaluation system according to claim 8,
   wherein when it is determined that a predetermined evaluation period has elapsed, the policy evaluation device transmits the request to the test server.

10. An evaluation system comprising a gateway device, a first control device, and a second control device,
    wherein the gateway device includes:
    a first communication unit for receiving a packet from the first control device;

a packet copying unit for copying the packet received in the first communication unit and transmitting to the gateway device and to the policy evaluation device;
a first policy storage unit in which the policy is stored;
a first filtering processing unit for performing a first filtering process on the copied packet based on the policy stored in the first policy storage unit;
a first communication unit for transmitting the packet that has passed through the first filtering process by the first filtering processing unit, to the second control device;
a first filter log storage unit in which the result of the first filtering process by the first filtering processing unit is stored;
a second policy storage unit in which the policy is stored;
a second filtering processing unit for performing a second filtering process on the copied packet based on the policy stored in the second policy storage unit;
a second filter log storage unit in which the result of the second filtering process by the second filtering processing unit is stored; and
a policy evaluation unit for evaluating the policy stored in the second policy storage unit, based on the result of the first filtering process stored in the first filter log storage unit, and based on the result of the second filtering process stored in the second filter log storage unit,
wherein the first filter loci storage unit stores the result of the first filtering process, including a first processing time of the first filtering process,
wherein the second filter log storage unit stores the result of the second filtering process, including a second processing time of the second filtering process, and
wherein the policy evaluation unit determines the difference between the first processing time and the second processing time, compares the second processing time with a predetermined processing time as limitation, and evaluates the policy stored in the second policy storage unit.

11. The evaluation system according to claim 10,
wherein the first filter log storage unit stores the result of the first filtering process, including a first result which is the accepting or blocking of the passage of the copied packet,
wherein the second filter log storage unit stores the result of the second filtering process, including a second result which is the accepting or blocking of the passage of the copied packet, and
wherein the policy evaluation unit determines the difference between the first result and the second result to evaluate the policy stored in the second policy storage unit.

12. The evaluation system according to claim 11,
wherein the policy evaluation unit evaluates the policy stored in the second policy storage unit based on completion notice from the first filtering processing unit and the second filtering processing unit.

13. The evaluation system according to claim 12, further comprising a test server,
wherein the test server transmits a test packet to the policy evaluation device in response to a request of the gateway device,
wherein the gateway device further includes a third communication unit for performing communication with the test server, and
wherein the second filtering processing unit performs the second filtering process on the packet received in the third communication unit based on the policy stored in the second policy storage unit.

* * * * *